United States Patent
Chen et al.

(10) Patent No.: US 12,063,375 B2
(45) Date of Patent: Aug. 13, 2024

(54) SMALL CHROMA BLOCK SIZE RESTRICTION IN VIDEO CODING

(71) Applicant: BEIJING DAJIA INTERNET INFORMATION TECHNOLOGY CO., LTD., Beijing (CN)

(72) Inventors: Yi-Wen Chen, Beijing (CN); Xiaoyu Xiu, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 349 days.

(21) Appl. No.: 17/672,556

(22) Filed: Feb. 15, 2022

(65) Prior Publication Data
US 2022/0224919 A1    Jul. 14, 2022

Related U.S. Application Data

(63) Continuation of application No. PCT/US2020/046501, filed on Aug. 14, 2020.
(Continued)

(51) Int. Cl.
G06K 9/00 (2022.01)
H04N 19/107 (2014.01)
(Continued)

(52) U.S. Cl.
CPC ......... H04N 19/186 (2014.11); H04N 19/107 (2014.11); H04N 19/70 (2014.11)

(58) Field of Classification Search
CPC .................................... H04N 19/103
See application file for complete search history.

(56) References Cited

U.S. PATENT DOCUMENTS 9,813,716 B2   11/2017 Miyoshi
11,496,736 B2 * 11/2022 Xu ..................... H04N 19/1883
(Continued)

FOREIGN PATENT DOCUMENTS

CN     102907100 A     1/2013
CN     109479137 A     3/2015
(Continued)

OTHER PUBLICATIONS

Hycongmun Jang, Non-CE: to support SCIPU with local dual tree for various color format, Joint Video Experts Team (JVET) of ITU-T SG 16 WP 3 and ISO/IEC JTC 1/SC 29/WG 11, Document: JVET-P0575, 16th Meeting: Geneva, CH, Oct. 1-11, 2019, 8 pgs.
(Continued)

*Primary Examiner* — Hadi Akhavannik
(74) *Attorney, Agent, or Firm* — Seed IP Law Group LLP

(57) ABSTRACT

An electronic apparatus performs a method for video decoding. The method comprises: receiving, from a bitstream, a coding unit and determining a mode type condition of the coding unit; if the coding unit is encoded in a first chroma format, setting the mode type condition of the coding unit to a first mode type condition; if the coding unit is encoded in a second chroma format and the coding unit is a smallest chroma intra prediction unit, setting the mode type condition of the coding unit to a second mode type condition if a luma block of the coding unit and the splitting method satisfy a first criterion; setting the mode type condition of the coding unit to a third mode type condition if the luma block of the coding unit and the splitting method satisfy a second criterion, and decoding the coding unit based on the mode type condition.

20 Claims, 11 Drawing Sheets

Related U.S. Application Data

(60) Provisional application No. 62/900,424, filed on Sep. 13, 2019, provisional application No. 62/887,650, filed on Aug. 15, 2019.

(51) Int. Cl.
*H04N 19/186* (2014.01)
*H04N 19/70* (2014.01)

(56) References Cited

U.S. PATENT DOCUMENTS

| | | | | |
|---|---|---|---|---|
| 11,533,483 | B2* | 12/2022 | Xu | H04N 19/107 |
| 2013/0251026 | A1 | 9/2013 | Guo et al. | |
| 2015/0003518 | A1 | 1/2015 | Nguyen et al. | |
| 2015/0146780 | A1 | 5/2015 | Miyoshi et al. | |
| 2016/0227245 | A1 | 8/2016 | Liu et al. | |
| 2016/0323573 | A1* | 11/2016 | Ikai | H04N 19/70 |
| 2018/0063525 | A1 | 3/2018 | Kim et al. | |
| 2018/0131963 | A1* | 5/2018 | Chuang | H04N 19/176 |
| 2019/0028700 | A1* | 1/2019 | Ikai | H04N 19/30 |
| 2019/0028701 | A1 | 1/2019 | Yu et al. | |
| 2019/0089960 | A1 | 3/2019 | Chen et al. | |
| 2019/0116363 | A1 | 4/2019 | Nakamura et al. | |
| 2019/0238863 | A1* | 8/2019 | Yoo | H04N 19/176 |
| 2019/0246128 | A1 | 8/2019 | Xu et al. | |
| 2020/0045311 | A1* | 2/2020 | Yoo | H04N 19/159 |
| 2020/0267402 | A1* | 8/2020 | Xu | H04N 19/593 |
| 2021/0044828 | A1* | 2/2021 | Pham Van | H04N 19/176 |
| 2021/0185316 | A1* | 6/2021 | Zhao | H04N 19/157 |
| 2021/0235079 | A1* | 7/2021 | Chuang | H04N 19/52 |
| 2022/0210437 | A1* | 6/2022 | Xu | H04N 19/186 |
| 2022/0224919 | A1* | 7/2022 | Chen | H04N 19/157 |

FOREIGN PATENT DOCUMENTS

| | | |
|---|---|---|
| CN | 105765974 A | 7/2016 |
| CN | 107079160 A | 8/2017 |
| CN | 107852499 A | 3/2018 |
| CN | 108713320 A | 10/2018 |
| CN | 109600611 A | 4/2019 |
| CN | 109792516 A | 5/2019 |
| EP | 2418855 A1 | 2/2012 |
| JP | 2022-518378 A | 3/2022 |
| WO | 2016074147 A1 | 5/2016 |
| WO | 2019/059676 | 3/2019 |
| WO | WO2020/143684 A1 | 7/2020 |
| WO | WO 2021026564 A1 | 2/2021 |

OTHER PUBLICATIONS

Luong Pham Van, Non-CE3: Generalization of SCIPU for different YUV formats, Joint Video Experts Team (JVET) of ITU-T SG 16 WP 3 and ISO/IEC JTC 1/SC 29/WG 11, Document: JVET-P0406-v3, 16th Meeting: Geneva, CH, Oct. 1-11, 2019, 7 pgs.

Yin Zhao, AHG16: Fix on local dual tree, Joint Video Experts Team (JVET) of ITU-T SG 16 WP 3 and ISO/IEC JTC 1/SC 29/WG 11, Document: JVET-P0520, 16th Meeting, Geneva, CH, Oct. 1-11, 2019, 7 pgs.

Zhipin Deng, Non-CE3: Cleanups on local dual tree for non-4:2:0 chroma formats, Joint Video Experts Tem (JVET) of ITU-T SG 16 WP 3 and ISO/IEC JTC 1/SC 29/WG 11, Document: JVET-P0537-v2, 16th Meeting: Geneva, CH, Oct. 1-11, 2019, 5 pgs.

Zhi-Yi Lin, CE3-2.1.1 and CE3-2.1.2: Removing 2x2, 2x4 and 4x2 chroma CBs, Joint Video Experts Team (JVET) of ITU-T SG 16 WP 3 and ISO/IEC JTC 1/SC 29/WG 11, Document: JVET-O0050-v2, 15th Meeting: Gothenburg, SE, Jul. 3-12, 2019, 12 pgs.

Yi-Wen Chen, Non-CE3: Spec fix for the smallest chroma intra prediction unit (SCIPU), Joint Video Experts Team (JVET) of ITU-T SG 16 WP 3 and ISO/IEC JTC 1/SC 29/WG 11, Document: JVET-P0520, 16th Meeting, Geneva, CH, Oct. 1-11, 2019, 2 pgs.

Xiaozhong Xu, Description of Core Experiment 8 (CE8): 4:4:4 Screen Content Coding Tools, Joint Video Experts Team (JVET) of ITU-T SG 16 WP 3 and ISO/IEC JTC 1/SC 29/WG 11, Document: JVET-O2028-v4, 15th Meeting: Gothenburg, SE, Jul. 3-12, 2019, 8 pgs.

Zhi-Yi Lin, CE3-related: Constrained partitioning of chroma intra CBs, Joint Video Experts Team (JVET) of ITU-T SG 16 WP 3 and ISO/IEC JTC 1/SC 29/WG 11, Document: JVET-N0082-v1, 14th Meeting: Geneva, CH, Mar. 19-27, 2019, 4 pgs.

Beijing Dajia Internet Information Technology Co. Ltd et al., International Search Report and Written Opinion, PCT/US2020/046501, Nov. 20, 2020, 9 pgs.

Benjamin Bross et al., "Versatile Video Coding (Draft 6)," Joint Video Experts Team (JVET) of ITU-T SG 16 WP 3 and ISO/IEC JTC 1S/C 29/WG 11, Document: JVET-O2001-vE, 15th Meeting: Gothenburg, SE, Jul. 3-12, 2019, 455 pgs.

JVET VVC, "Issue of SCIPU in YUV444," #456 closed defect (fixed), Version VTM-6.0rc 1, 1 page.

JVET VVC, "Timeline" Aug. 13-14, 2019, (pp. 1 of 10), 1 page.

* cited by examiner

SMALL CHROMA BLOCK SIZE RESTRICTION IN VIDEO CODING

CROSS-REFERENCE TO RELATED APPLICATIONS

The present application is a continuation application of International Application No. PCT/US2020/046501, entitled "SMALL CHROMA BLOCK SIZE RESTRICTION IN VIDEO CODING" filed on Aug. 14, 2020, which is based upon and claims priority to U.S. Application No. 62/887,650, entitled "SMALL CHROMA BLOCK SIZE RESTRICTION IN VIDEO CODING" filed on Aug. 15, 2019 and U.S. Application No. 62/900,424, entitled "SMALL CHROMA BLOCK SIZE RESTRICTIONS IN VIDEO CODING" filed on Sep. 13, 2019, respectively, which are incorporated by reference in their entireties for all purposes.

TECHNICAL FIELD

The present application generally relates to video data coding and compression, and in particular, to method and system of restricting the smallest available block size in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to system and method of restricting the smallest available block size in video coding.

According to a first aspect of the present application, a method of decoding video data includes receiving, from bitstream, data encoding a coding tree node, wherein the coding tree node is associated with a predefined splitting method; determining a mode type of the coding tree node, including: in accordance with a determination that the coding tree node is encoded in 4:4:4 or 4:0:0 chroma subsampling format, setting the coding tree node to a first mode type; in accordance with a determination that the coding tree node is encoded in 4:2:2 or 4:2:0 chroma subsampling format and the coding tree node is a smallest chroma intra prediction unit (SCIPU): setting the coding tree node to a second mode type if a luma block of the coding tree node and the splitting method satisfy a first criterion; and setting the coding tree node to a third mode type if the luma block of the coding tree node and the splitting method satisfy a second criterion; and decoding the coding tree unit based on the mode type, including: in accordance with a determination that the coding tree node is the second mode: decoding each coding block in the coding tree node using intra prediction mode, in accordance with a determination that the coding tree node is the first mode or the third mode: receiving, from the bitstream, a syntax element indicating a prediction mode associated with the coding tree node: in accordance with a determination that the syntax element has a first value: decoding each coding block in the coding tree node using inter prediction mode; and in accordance with a determination that the syntax element has a second value: decoding each coding block in the coding tree node using intra prediction mode.

According to a second aspect of the present application, an electronic apparatus includes one or more processing units, memory and a plurality of programs stored in the memory. The programs, when executed by the one or more processing units, cause the electronic apparatus to perform the method of decoding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
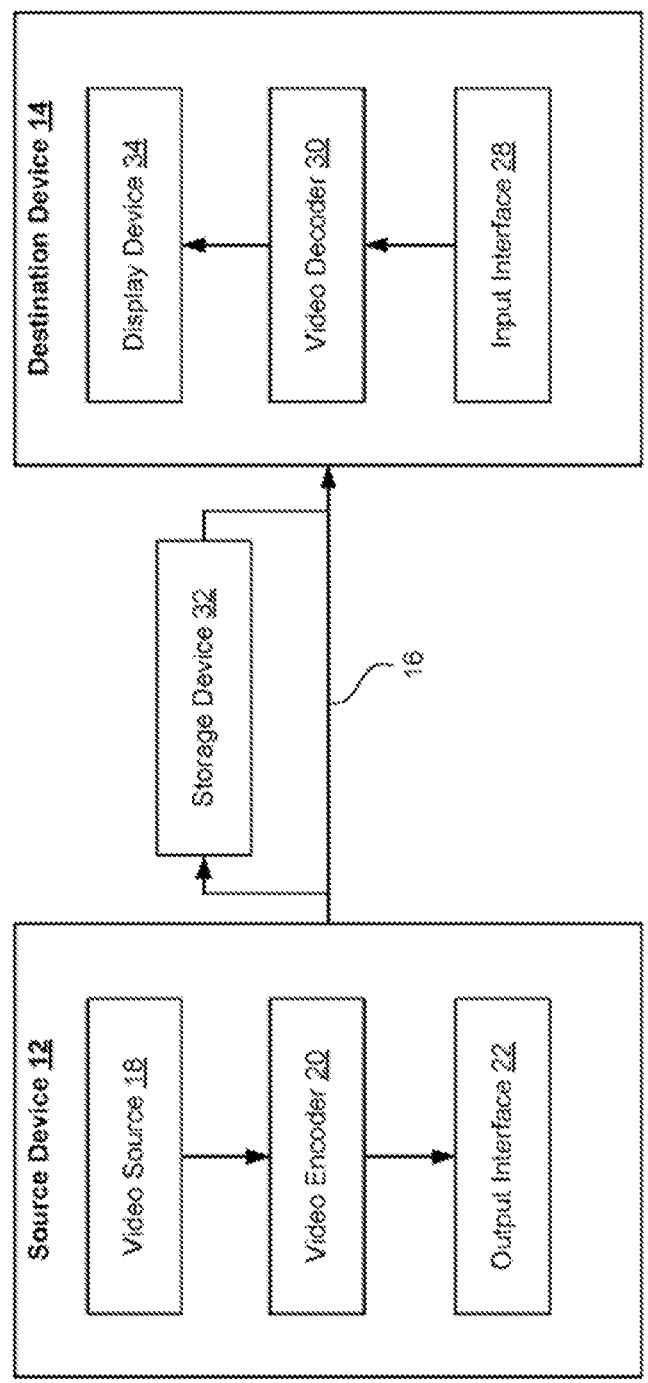
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
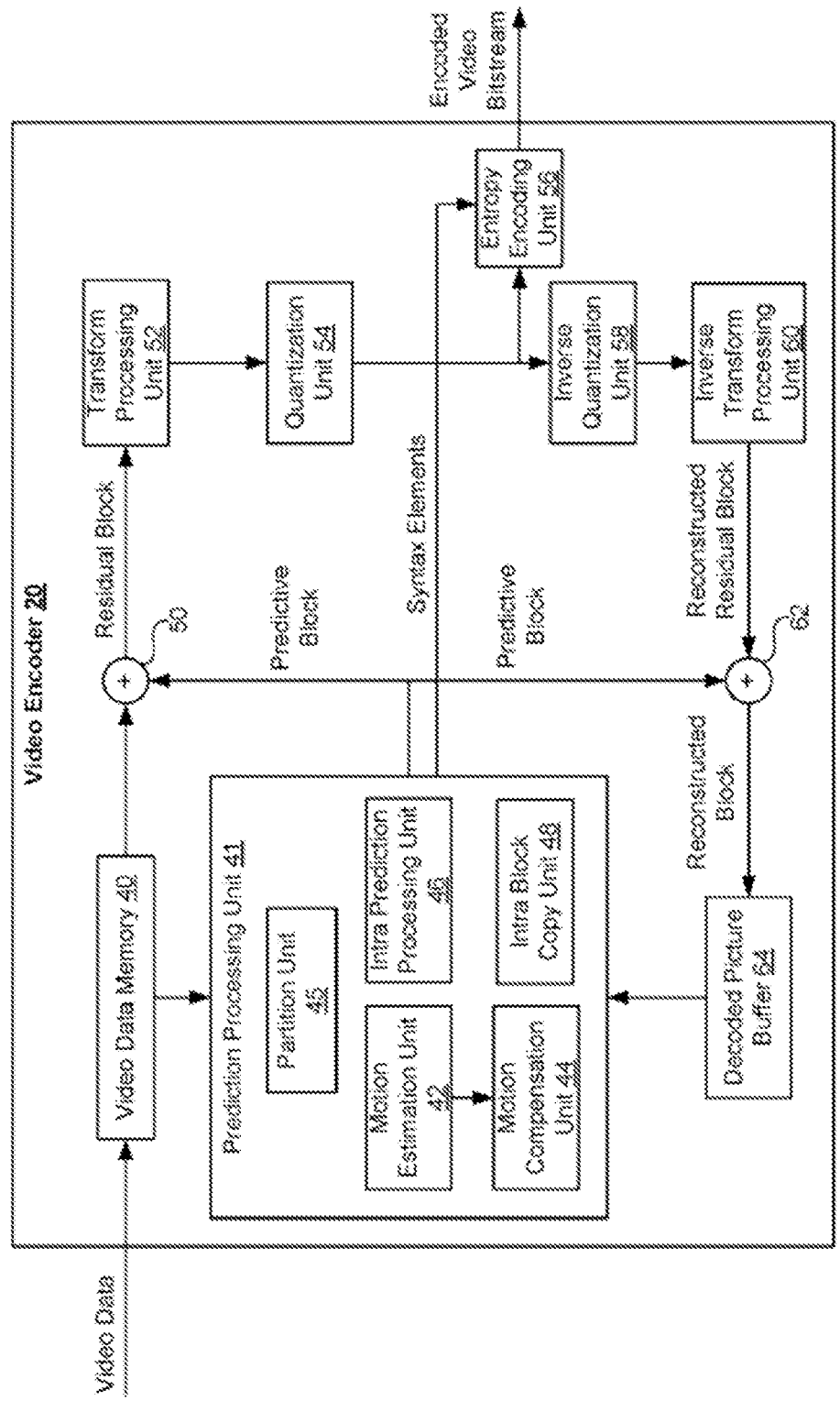
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
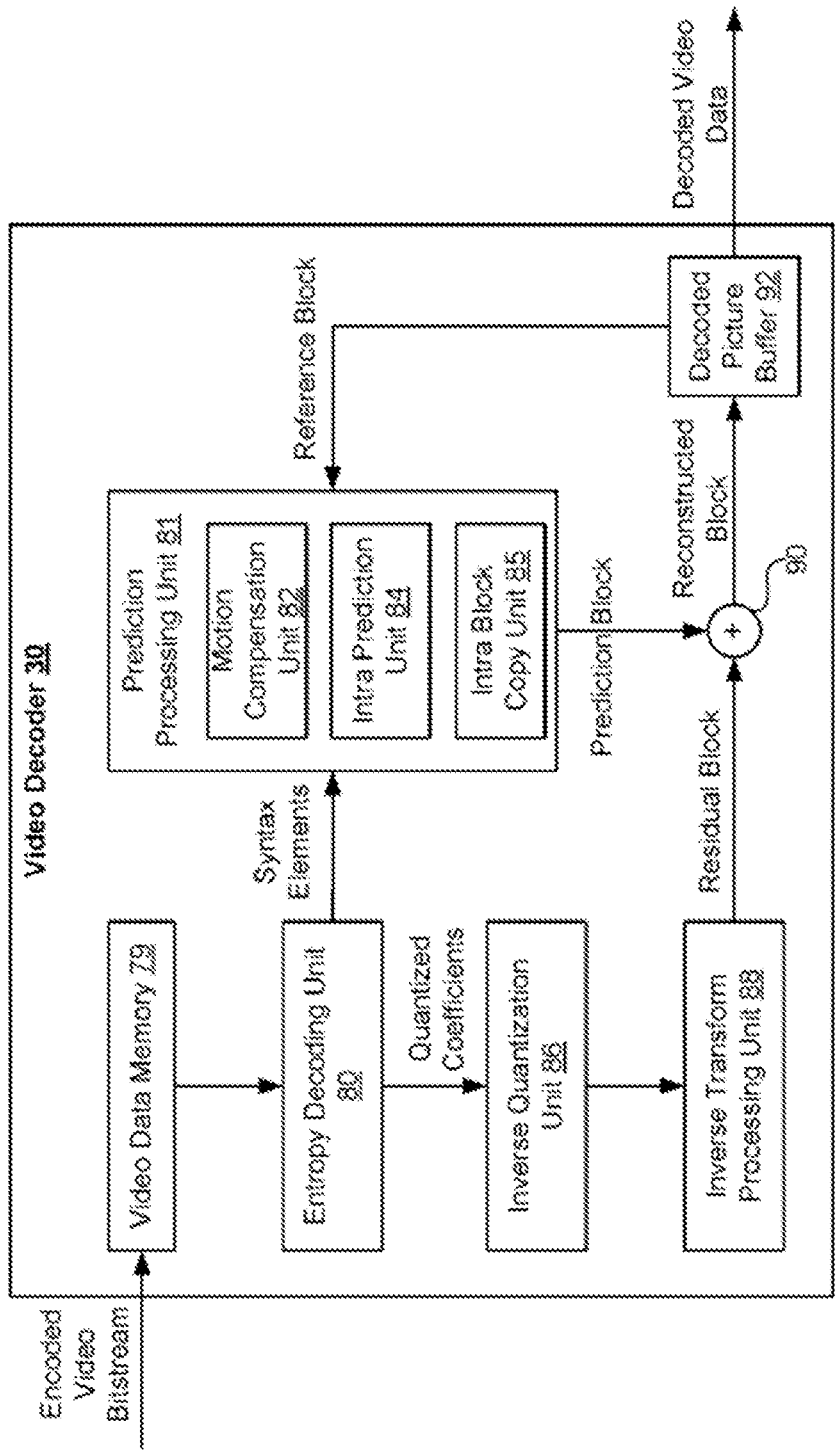
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
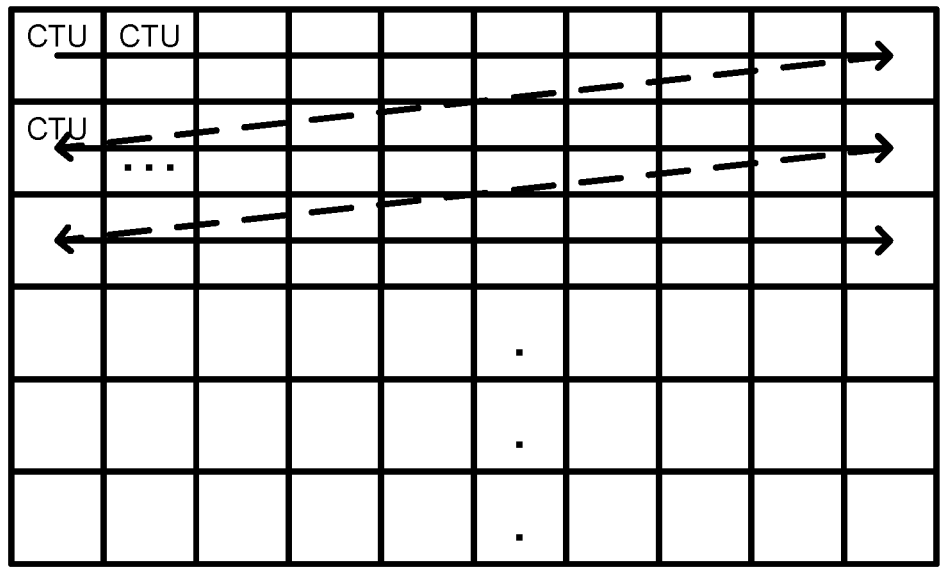
FIGS. 4A through 4E are block diagrams illustrating how a frame is recursively partitioned into multiple video blocks of different sizes and shapes in accordance with some implementations of the present disclosure.
Figure 4B:
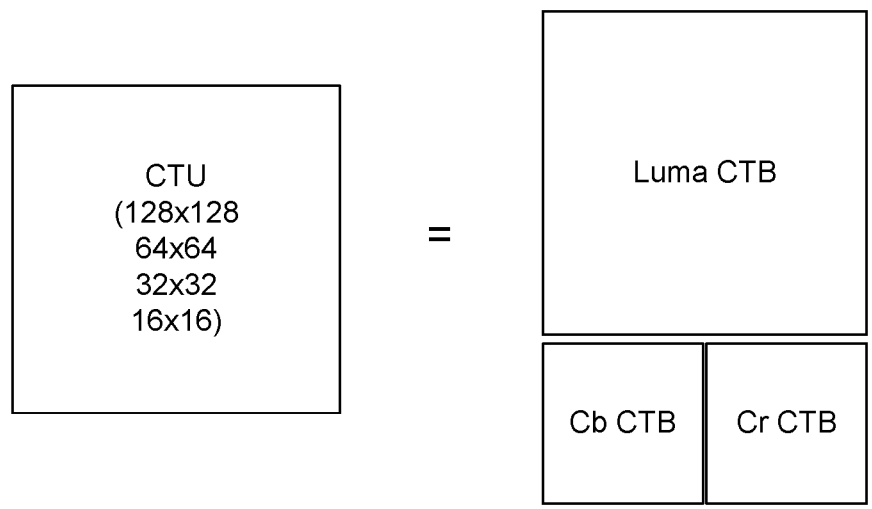

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
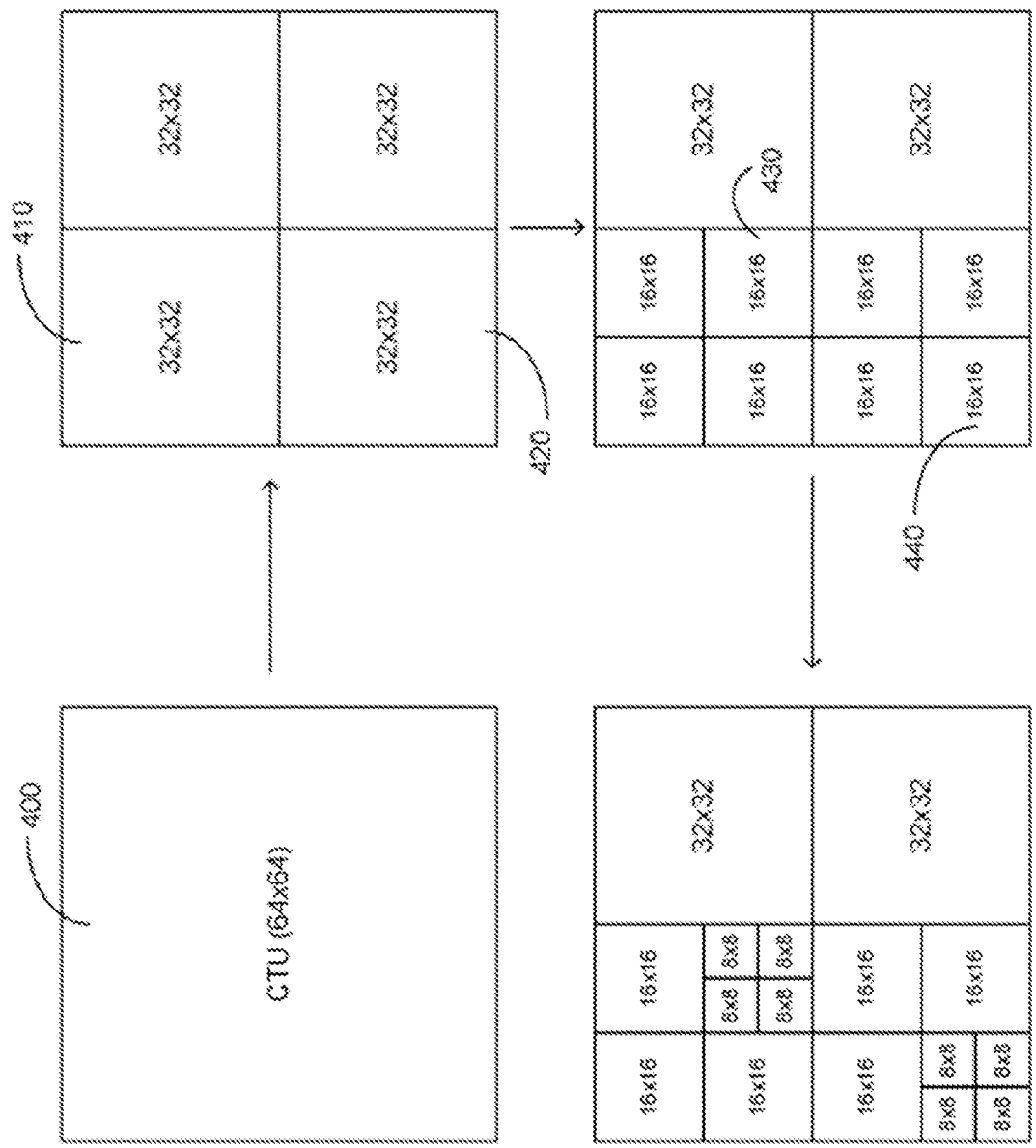
Figure 4D:
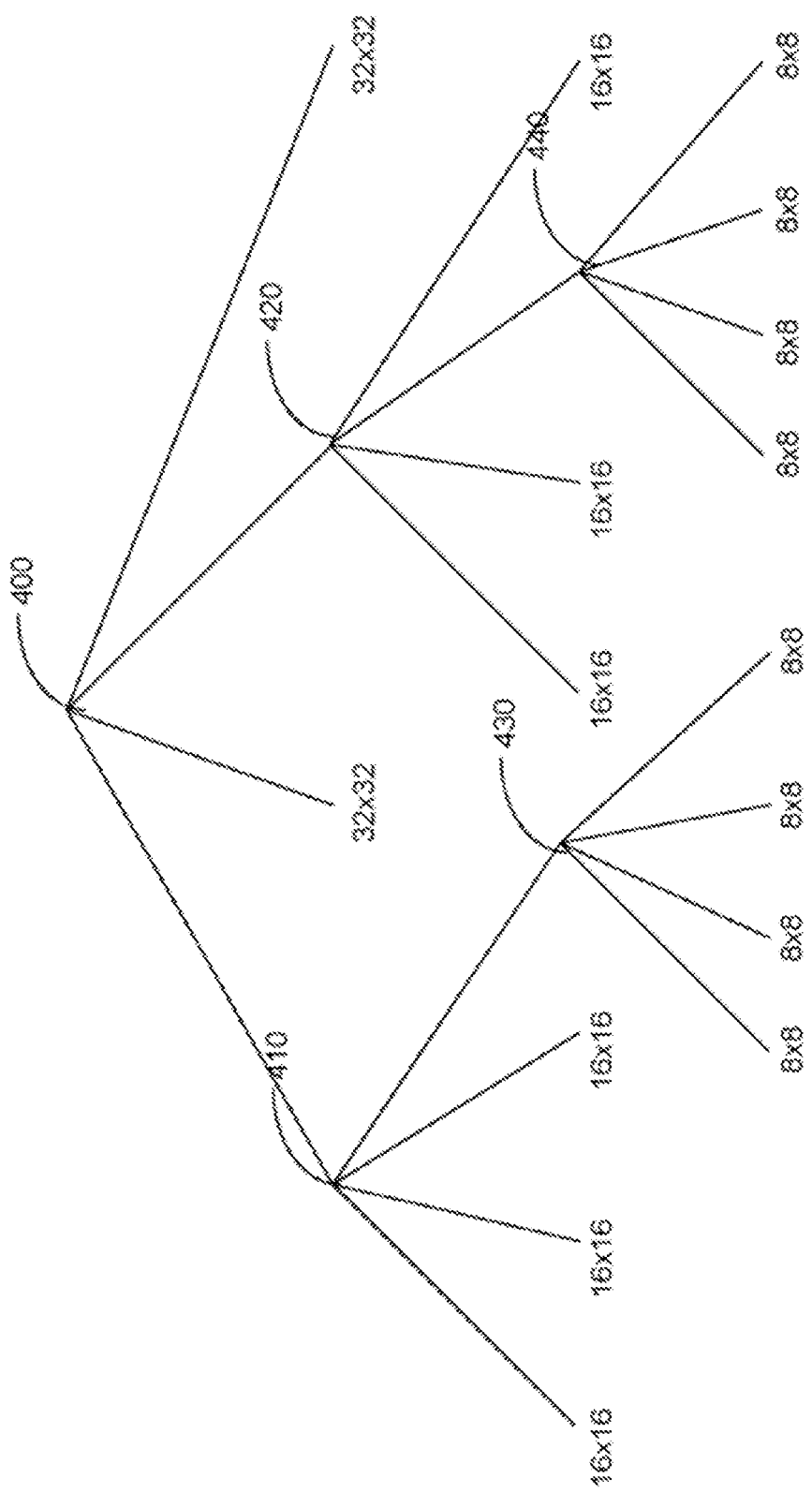
Figure 4E:
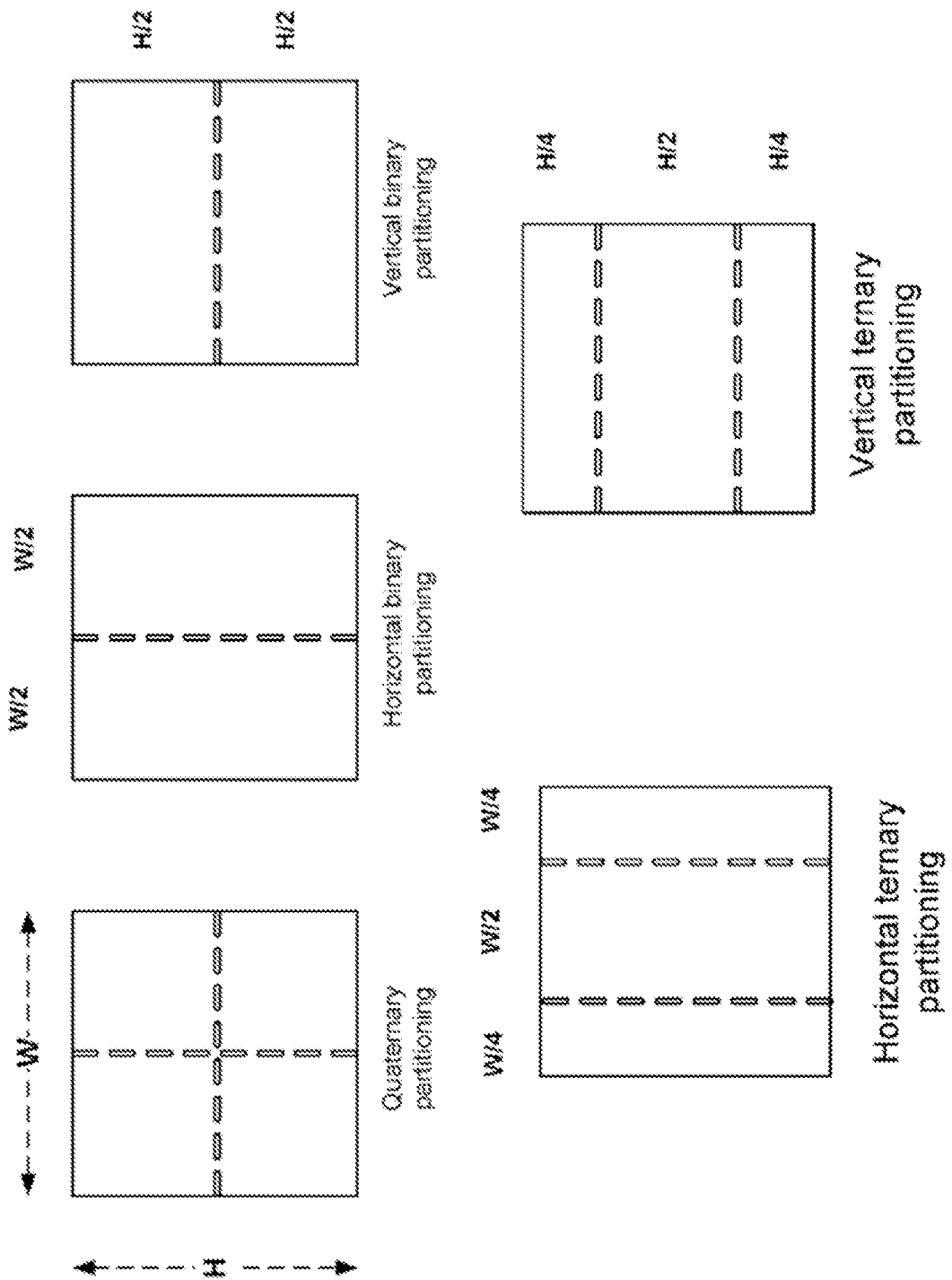

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5:
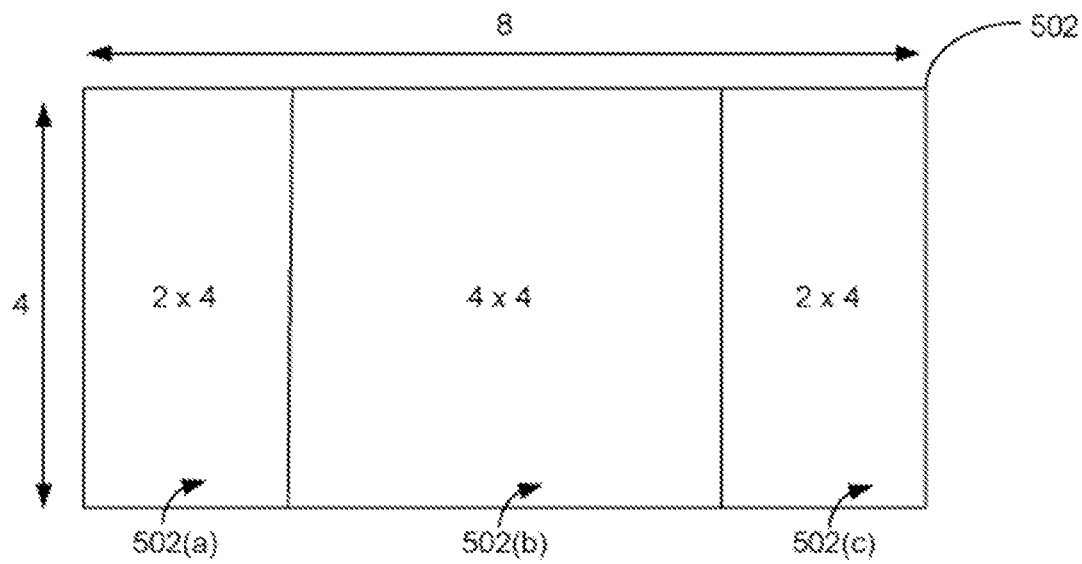
FIG. 5 is a block diagram illustrating examples of smallest chroma intra prediction units (SCIPUs) in accordance with some implementations of the present disclosure.
Figure 5:
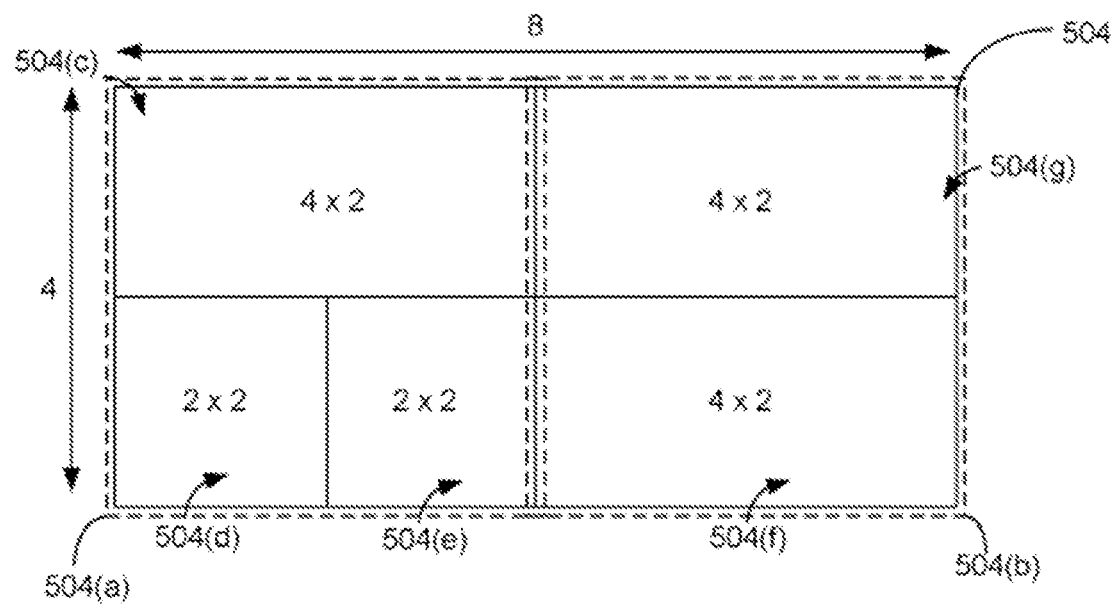

FIG. 5 is a block diagram illustrating examples of smallest chroma intra prediction units (SCIPUs) in accordance with some implementations of the present disclosure.

In typical hardware video encoders and decoders, processing throughput drops when a picture has a large number of small intra blocks because of sample processing data dependency between neighboring intra blocks. The predictor generation of an intra block requires top and left boundary reconstructed samples from neighboring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed.

In VTM5.0, in dual tree, 2×2/4×2/2×4 chroma blocks are already disabled in dual tree. However, in single coding tree of VTM5, since chroma partitions always follows luma and the smallest intra CU is 4×4 luma samples, the smallest chroma intra CB is 2×2. Therefore, in VTM5.0, the smallest chroma intra CBs in single coding tree is 2×2. The worst case hardware processing throughput for VVC decoding is only ¼ of that for HEVC decoding. Moreover, the reconstruction process of a chroma intra CB becomes much more complex than that in HEVC after adopting tools including cross-component linear model (CCLM), 4-tap interpolation filters, position-dependent intra prediction combination (PDPC), and combined inter intra prediction (CIIP). It is challenging to achieve high processing throughput in hardware decoders. In this contribution, two methods that improve the worst case hardware processing throughput are proposed.

The goal of the scheme of SCIPU is to disallow chroma intra CBs smaller than 16 chroma samples by constraining the partitioning of chroma intra CBs.

In single coding tree, an SCIPU is defined as a coding tree node whose chroma block size is larger than or equal to 16 chroma samples and has at least one child luma block smaller than 4*16 luma samples. It is required that in each SCIPU, all CBs are inter, or all CBs are non-inter, i.e., either intra or intra block copying (IBC). The detail of IBC could be referred to (document JVET-N1002 at http://phenix.int-evry.fr/jvet/). In case of a non-inter SCIPU, it is further required that chroma of the non-inter SCIPU shall not be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU.

Two SCIPU examples are shown in FIG. 5. Chroma CB 502 of 8×4 chroma samples and corresponding luma CBs (luma CBs corresponding to chroma CB 502(a), 502(b), and 502(c)) form one SCIPU because the ternary tree (TT) split from the 8×4 chroma samples would result in chroma CBs smaller than 16 chroma samples (e.g., chroma CBs 502(a) and 502(c)). Chroma CB 504(a) of 4×4 chroma samples (the left side of the chroma CB 504 of 8×4 chroma samples) and three luma CBs corresponding to the chroma CBS 504(c), 504(d), and 504(e) form one SCIPU, and chroma CB 504(b) of 4×4 samples (the right side of the 8×4 chroma samples) and two luma CBs (e.g., luma CBs corresponding to chroma CBs 504(g) and 504(h)) form one SCIPU because the binary tree (BT) split from the 4×4 chroma samples would result in chroma CBs smaller than 16 chroma samples (e.g., chroma CBs 504(g) and 504(f)).

The type of an SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signaled flag before parsing the CUs in the SCIPU. In the version 6 of VVC draft spec, the derivation of the types of an SCIPU is illustrated in Table 1 below. The modeTypeCondition 1 is defined as an SCIPU with type "non-inter" while the modeTypeCondition 2 is defined as an SCIPU with the type "inter or non-inter" and one flag "mode_constraint_flag" is signaled into the bitstream to indicate whether inter or non-inter is used by the associated SCIPU. The modeTypeCondition 0 represent conditions when the current CU spliting node is not SCIPU. The defination of all the variables in Table 2 can be referred to the version 6 of VVC draft spec (document NET-O2001 at http://phenix.int-evry.fr/jvet/). It is noted that the cbWidth and cbHeight are width and height of a coding block in luma samples, respectively.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies: If separate_colour_plane_flag is equal to 0, each of the two chroma arrays has the same height and width as the luma array. Otherwise (separate_colour_plane_flag is equal to 1), the three colour planes are separately processed as monochrome sampled pictures.

Figure 6A:
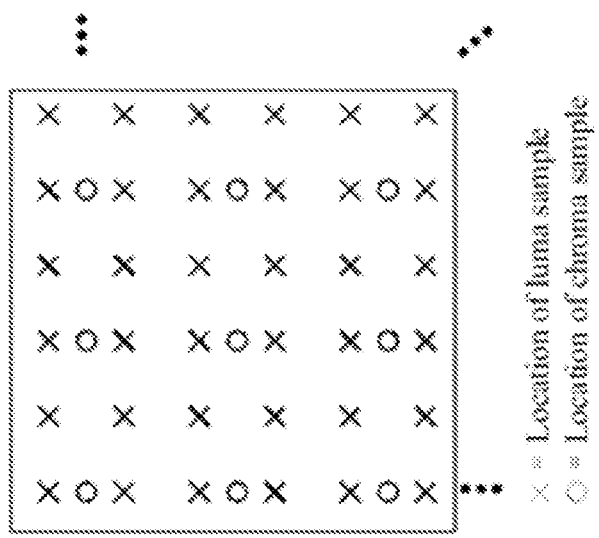
FIGS. 6A-6C are block diagrams illustrating examples of chroma formats supported in VVC in accordance with some implementations of the present disclosure.

When the value of chroma_format_idc is equal to 1, the nominal vertical and horizontal relative locations of luma and chroma samples in pictures are shown in FIG. 6A. Alternative chroma sample relative locations may be indicated in video usability information.

TABLE 1

The variable modeTypeCondition is derived as follows:
- If one of the following conditions is true, modeTypeCondition is set equal to 0
    - slice_type = = I and qtbtt_dual_tree_intra_flag is equal to 1
    - modeTypeCurr is not equal to MODE_ALL
- Otherwise, if one of the following conditions is true, modeTypeCondition is set equal to 1
    - cbWidth * cbHeight is equal to 64 and split_qt_flag is equal to 1
    - cbWidth * cbHeight is equal to 64 and MttSplitMode[ x0 ][ y0 ][ mttDepth ] is equal to SPLIT_TT_HOR or SPLIT_TT_VER
    - cbWidth * cbHeight is equal to 32 and MttSplitMode[ x0 ][ y0 ][ mttDepth ] is equal to SPLIT_BT_HOR or SPLIT_BT_VER
- Otherwise, if one of the following conditions is true, modeTypeCondition is set equal to 1 + (slice_type != I ? 1 : 0)
    - cbWidth * cbHeight is equal to 64 and MttSplitMode[ x0 ][ y0 ][ mttDepth ] is equal to SPLIT_BT_HOR or SPLIT_BT_VER
    - cbWidth * cbHeight is equal to 128 and MttSplitMode[ x0 ][ y0 ][ mttDepth ] is equal to SPLIT_TT_HOR or SPLIT_TT_VER
- Otherwise, modeTypeCondition is set equal to 0 mode_constraint_flag equal to 0 specifies that coding units inside the current coding tree node can only use inter prediction coding modes. mode_constraint_flag equal to 1 specifies that coding units inside the current coding tree node cannot use inter prediction coding modes.

By applying the SCIPU scheme as described above, the worst case hardware processing throughput occurs when 4×4, 2×8, or 8×2 chroma blocks, instead of a 2×2 chroma blocks, are processed. The worst case hardware processing throughput is the same as that in HEVC and is 4× of that in VTM5.0.

Figure 6B:
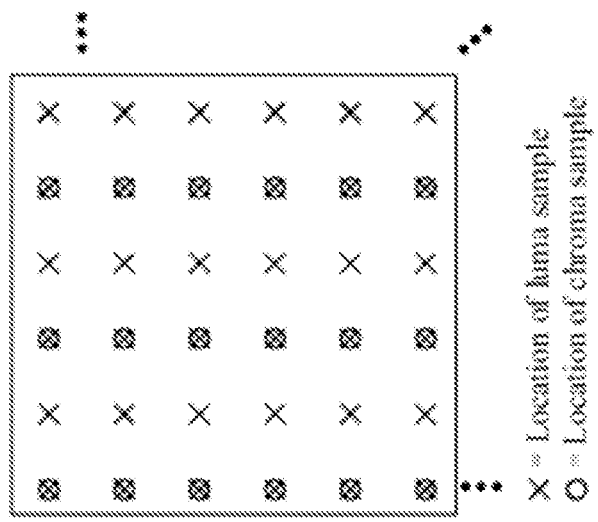
Figure 6C:
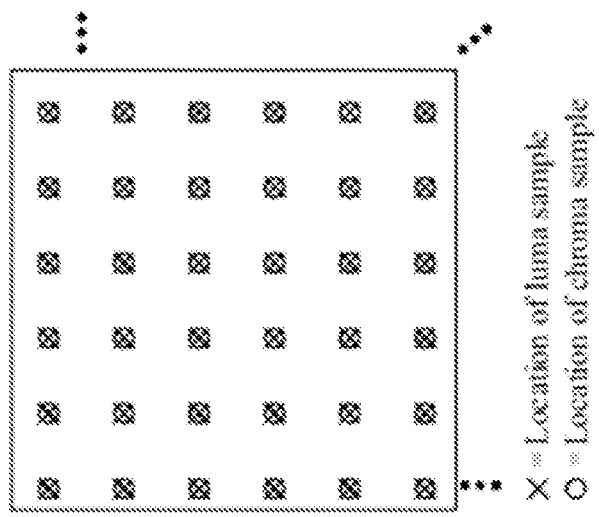

FIGS. 6A-6C are block diagrams illustrating examples of chroma formats (e.g., also known as chroma subsampling formats) supported in VVC in accordance with some implementations of the present disclosure. Table 2 below shows information for different chroma formats. For example, the variables SubWidthC and SubHeightC are used to specify the ratio between the width and height of a luma block and its associated chroma blocks.

When the value of chroma_format_idc is equal to 2, the chroma samples are co-sited with the corresponding luma samples and the nominal locations in a picture are as shown in FIG. 6B.

When the value of chroma_format_idc is equal to 3, all array samples are co-sited for all cases of pictures and the nominal locations in a picture are as shown in FIG. 6C.

Figure 7:
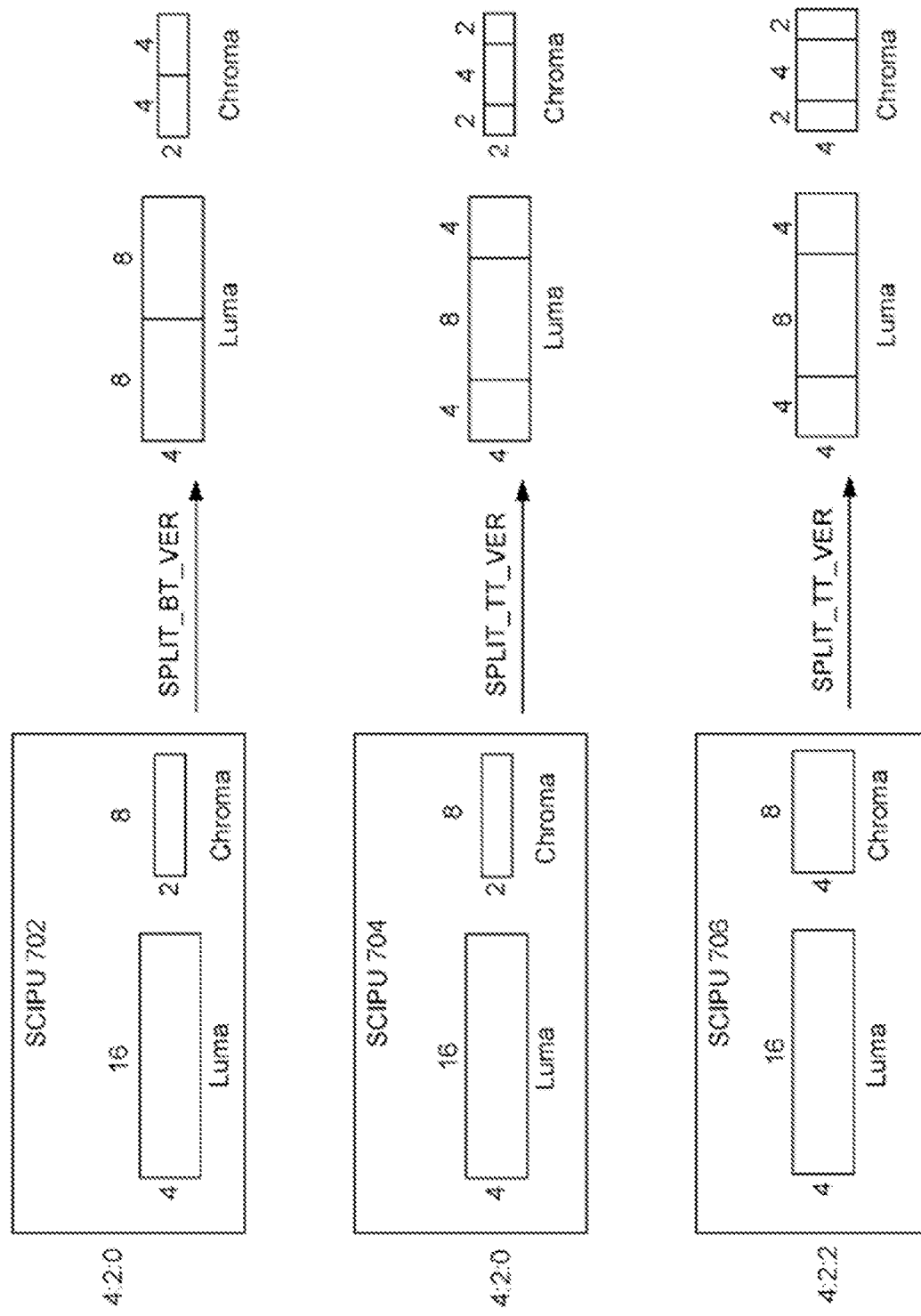
FIG. 7 is a block diagram illustrating examples of smallest chroma intra prediction units (SCIPUs) in various chroma formats in accordance with some implementations of the present disclosure.

FIG. 7 is a block diagram illustrating examples of SCIPUs in various chroma formats in accordance with some implementations of the present disclosure.

When the concept of SCIPU was adopted into VVC, the design only considered the chroma format 4:2:0. The other chroma formats are not considered and the design therefore imposed over-restrictive rules to the size of intra chroma

TABLE 2

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

blocks for the chroma formats other than 4:2:0 (e.g. 4:4:4 and 4:2:2). Specifically, when the SCIPU was proposed, it was defined as a coding tree node whose chroma block size is larger than or equal to 16 chroma samples and has at least one child luma block smaller than 4×16 luma samples. Using the 4× the luma samples (e.g., when a block is encoded in 4:2:0 chroma format, there are four times as many luma samples as chroma samples) to define the SCIPU only works correctly when the chroma format is 4:2:0. In current VVC, no matter what chroma format is used, the chroma size restriction is always applied through the SCIPU scheme with the assumption that the chroma format is 4:2:0 which implies that both width and height of the chroma block are half of the width and height of the associated luma block.

Moreover, the palette mode is newly adopted into VVC in 15$^{th}$ JVET meeting (refer to the document NET-O0119 at http://phenix.int-evry.fr/jvet/) and when the mode of the SCIPU is signaled as inter, only inter modes are allowed within this SCIPU and the chroma blocks could thus be split into small blocks such as 2×4 or 4×2 chroma blocks. While non-inter is signaled as the mode of the SCIPU or the modeTypeCondition of the SCIPU is non-inter (e.g. modeTypeCondition=0), only intra prediction modes, IBC and palette modes are allowed for the SCIPU and the chroma block could not be split into small chroma blocks such as 2×2, 2×4 or 4×2. However, it requires no information from the left and above neighbor reconstructed pixels for palette mode and thus the palette mode should be regarded as a mode which allows the chroma block be split into small chroma blocks.

In some embodiments, an SCIPU is defined as a coding tree node whose chroma block size is larger than or equal to N chroma samples and has at least one child luma block smaller than K×N luma samples with one further CU split. N could be any positive integer (e.g. 16) and K is 4 for chroma format 4:2:0 (chroma_format_idc=1), K is 2 for chroma format 4:2:2, and K is 1 for chroma format 4:4:4. It is noted that K=1 for chroma format 4:4:4 implies the SCIPU is not enabled.

7, SCIPU 702 is a valid SCIPU because splitting the coding tree node according to the predefined splitting method (e.g., binary vertical split) would result in a chroma component with fewer than 16 chroma samples (e.g., a chroma component with 2×4 chroma samples). SCIPU 704 is a valid SCIPU because splitting the CB according to the predefined splitting method (e.g., ternary vertical split) would result in a chroma component with fewer than 16 chroma samples (e.g., a chroma component with 2×2 chroma samples). SCIPU 706 is a valid SCIPU because splitting the CB with the predefined splitting method (e.g., ternary vertical split) would result in a chroma component with fewer than 16 chroma samples (e.g., a chroma component with 4×2 chroma samples).

The type of an SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signaled flag before parsing the CUs in the SCIPU.

When the chroma format is 4:4:4 (chroma_format_idc=3), the number of the chroma samples and the number of the luma samples within one block are the same and therefore there is no need to impose any size restrict on the chroma blocks when the chroma format is 4:4:4. For example, for an 8×8 SCIPU which uses quad-tree split, since it contains four 4×4 luma blocks partitioned by the quad-tree split, the type of an SCIPU is inferred to be non-inter according to the current design (see Table 1 above). And according to current design, a non-inter type SCIPU does not allow the chroma block (8×8 chroma block in this example) to be further split. And it is obvious that size constraints on the chroma block is too restrictive because an 8×8 intra chroma block can be split into four 4×4 intra chroma blocks without introducing additional throughput issue. According to the second embodiment, it is proposed to disable the SCIPU scheme when the coded picture is in the chroma format 4:4:4. One example of spec is illustrated in Table 3 below.

TABLE 3

The example of the spec of the proposed method to additionally consider chroma format 4:4:4

The variable modeTypeCondition is derived as follows:
- If one of the following conditions is true, modeTypeCondition is set equal to 0
    - slice_type = = I and qtbtt_dual_tree_intra_flag is equal to 1
    - modeTypeCurr is not equal to MODE_ALL
    - chroma_format_idc is equal to 3
- Otherwise, if one of the following conditions is true, modeTypeCondition is set equal to 1
    - cbWidth * cbHeight is equal to 64 and split_qt_flag is equal to 1
    - cbWidth * cbHeight is equal to 64 and MttSplitMode[ x0 ][ y0 ][ mttDepth ] is equal to SPLIT_TT_HOR or SPLIT_TT_VER
    - cbWidth * cbHeight is equal to 32 and MttSplitMode[ x0 ][ y0 ][ mttDepth ] is equal to SPLIT_BT_HOR or SPLIT_BT_VER
- Otherwise, if one of the following conditions is true, modeTypeCondition is set equal to 1 + (slice_type != I ? 1 : 0)
    - cbWidth * cbHeight is equal to 64 and MttSplitMode[ x0 ][ y0 ][ mttDepth ] is equal to SPLIT_BT_HOR or SPLIT_BT_VER
    - cbWidth * cbHeight is equal to 128 and MttSplitMode[ x0 ][ y0 ][ mttDepth ] is equal to SPLIT_TT_HOR or SPLIT_TT_VER
- Otherwise, modeTypeCondition is set equal to 0
mode_constraint_flag equal to 0 specifies that coding units inside the current coding tree node can only use inter prediction coding modes. mode_constraint_flag equal to 1 specifies that coding units inside the current coding tree node cannot use inter prediction coding modes.

In some embodiments, the SCIPU is defined as a coding tree node whose chroma block size is larger than or equal to N chroma samples and has at least one child chroma block smaller than N luma samples with one further CU split. N could be any positive integer (e.g. 16). For example, in FIG.

When the chroma format is 4:2:2 (chroma_format_idc=2), the height of the chroma samples and the height of the luma samples within one block are the same but the width of the chroma samples are half of the width of the luma samples and therefore the derivation of the modeTypeCondition for the SCIPU has to be modified accordingly when the chroma format is 4:2:2. According to the third embodiment in this disclosure, it is proposed to consider the chroma format 4:2:2 when the SCIPU scheme is applied to avoid over-limit the chroma intra block size. Specifically, the SCIPU is defined as a coding tree node whose chroma block size is larger than or equal to sixteen chroma samples and has at least one child chroma block smaller than 16 chroma samples with one further split. An example of the proposed restrict on the format 4:2:2 based on VVC spec is illustrated in Table 4. In the modified modeTypeCondition derivation method, five more conditions are added for chroma format 4:2:2 for the non-inter type SCIPU. For example, an 8×8 block with quad-tree CU split applied is regarded as an SCIPU because it's child blocks include chroma block smaller than 16 chroma samples (it contains four 4×4 luma blocks and four 2×4 chroma blocks for 4:2:2 chroma format). Moreover, since its child blocks include 4×4 luma block, this SCIPU is regarded as non-inter type SCIPU. Similarly, A 16×4 block with the TT horizontal split (SPLIT_TT_VER) is also regarded as non-inter type SCIPU because its child blocks include 4×4 luma blocks and chroma blocks smaller than 16 chroma samples (it contains two 4×4 luma blocks and one 8×4 luma block, two 2×4 chroma blocks and one 4×4 chroma block). More examples could be referred to in the Table 4 below.

TABLE 4

The example of the spec of the proposed method to additionally consider chroma format 4:2:2

The variable modeTypeCondition is derived as follows:
- If one of the following conditions is true, modeTypeCondition is set equal to 0
  - slice_type = = I and qtbtt_dual_tree_intra_flag is equal to 1
  - modeTypeCurr is not equal to MODE_ALL
- Otherwise, if one of the following conditions is true, modeTypeCondition is set equal to 1
  - cbWidth * cbHeight is equal to 64 and split_qt_flag is equal to 1 and chroma_format_idc is equal to 1
  - cbWidth is equal to 8 and cbHeight is equal to 8 and split_qt_flag is equal to 1 and chroma_format_idc is equal to 2
  - cbWidth * cbHeight is equal to 64 and MttSplitMode[ x0 ][ y0 ][ mttDepth ] is equal to SPLIT_TT_HOR or SPLIT_TT_VER and chroma_format_idc is equal to 1
  - cbWidth is equal to 16 and cbHeight is equal to 4 and MttSplitMode[ x0 ][ y0 ][ mttDepth ] SPLIT_TT_VER and chroma_format_idc is equal 2
  - cbWidth is equal to 4 and cbHeight is equal to 16 and MttSplitMode[ x0 ][ y0 ][ mttDepth ] SPLIT_TT_HOR and chroma_format_idc is equal 2
  - cbWidth * cbHeight is equal to 32 and MttSplitMode[ x0 ][ y0 ][ mttDepth ] is equal to SPLIT_BT_HOR or SPLIT_BT_VER and chroma_format_idc is equal to 1
  - cbWidth is equal to 8 and cbHeight is equal to 4 and MttSplitMode[ x0 ][ y0 ][ mttDepth ] is equal to SPLIT_BT_VER and chroma_format_idc is equal to 2
  - cbWidth is equal to 4 and cbHeight is equal to 8 and MttSplitMode[ x0 ][ y0 ][ mttDepth ] is equal to SPLIT_BT_HOR and chroma_format_idc is equal to 2
- Otherwise, if one of the following conditions is true, modeTypeCondition is set equal to 1 + (slice_type != I ? 1 : 0)
  - cbWidth * cbHeight is equal to 64 and MttSplitMode[ x0 ][ y0 ][ mttDepth ] is equal to SPLIT_BT_HOR or SPLIT_BT_VER and chroma_format_idc is equal to 1
  - cbWidth * cbHeight is equal to 128 and MttSplitMode[ x0 ][ y0 ][ mttDepth ] is equal to SPLIT_TT_HOR or SPLIT_TT_VER and chroma_format_idc is equal to 1
  - cbWidth * cbHeight is equal to 64 and MttSplitMode[ x0 ][ y0 ][ mttDepth ] is equal to SPLIT_BT_HOR or SPLIT_BT_VER and chroma_format_idc is equal to 1
- Otherwise, modeTypeCondition is set equal to 0
mode_constraint_flag equal to 0 specifies that coding units inside the current coding tree node can only use inter prediction coding modes. mode_constraint_flag equal to 1 specifies that coding units inside the current coding tree node cannot use inter prediction coding modes.

It is noted that CUs with width*height equal to 64 could be 8×8, 16×4 or 4×16 in current VVC. 8×8 CU is the only size which could apply quad-tree split (split_qt_flag is equal to 1). No Ternary tree (TT) split is allowed for an 8×8 CU. And only SPLIT_TT_VER is allowed for a 16×4 CU in current VVC and only SPLIT_TT_HOR is allowed for a 4×16 CU. Similarly, CUs with width*height equal to 32 could be 8×4 or 4×8 in current VVC. Only SPLIT_BT_VER is allowed for an 8×4 CU and only SPLIT_BT_HOR is allowed for a 4×8 CU. Therefore, the derivation of modeTypeCondition could be simplified from Table 4 to Table 5 shown below and it is noted that the derivation methods in Table 4 and Table 5 will result in the same modeTypeCondition in current VVC.

TABLE 5

The example of the spec of the proposed method to additionally consider chroma format 4:2:2

The variable modeTypeCondition is derived as follows:
- If one of the following conditions is true, modeTypeCondition is set equal to 0
  - slice_type = = I and qtbtt_dual_tree_intra_flag is equal to 1
  - modeTypeCurr is not equal to MODE_ALL TABLE 5-continued The example of the spec of the proposed method to additionally consider chroma format 4:2:2

- Otherwise, if one of the following conditions is true, modeTypeCondition is set equal to 1
  - cbWidth * cbHeight is equal to 64 and split_qt_flag is equal to 1 and chroma_format_idc is equal
    to 1or 2
  - cbWidth * cbHeight is equal to 64 and MttSplitMode[ x0 ][ y0 ][ mttDepth ] is equal to
    SPLIT_TT_HOR or SPLIT_TT_VER and chroma_format_idc is equal to 1 or 2
  - cbWidth * cbHeight is equal to 32 and MttSplitMode[ x0 ][ y0 ][ mttDepth ] is equal to
    SPLIT_BT_HOR or SPLIT_BT_VER and chroma_format_idc is equal to 1 or 2
- Otherwise, if one of the following conditions is true, modeTypeCondition is set equal to
  1 + (slice_type != I ? 1 : 0)
  - cbWidth * cbHeight is equal to 64 and MttSplitMode[ x0 ][ y0 ][ mttDepth ] is equal to
    SPLIT_BT_HOR or SPLIT_BT_VER and chroma_format_idc is equal to 1
  - cbWidth * cbHeight is equal to 128 and MttSplitMode[ x0 ][ y0 ][ mttDepth ] is equal to
    SPLIT_TT_HOR or SPLIT_TT_VER and chroma_format_idc is equal to 1
  - cbWidth * cbHeight is equal to 64 and MttSplitMode[ x0 ][ y0 ][ mttDepth ] is equal to
    SPLIT_BT_HOR or SPLIT_BT_VER and chroma_format_idc is equal to 1
- Otherwise, modeTypeCondition is set equal to 0
mode_constraint_flag equal to 0 specifies that coding units inside the current coding tree node can only
use inter prediction coding modes. mode_constraint_flag equal to 1 specifies that coding units inside the
current coding tree node cannot use inter prediction coding modes.

When the chroma format is monochrome (chroma_format_idc=0), there are no chroma samples within one block therefore there is no need to impose any size restrict on the chroma blocks when the chroma format is monochrome. According to the fourth embodiment in this disclosure, it is proposed to consider the chroma format monochrome when the SCIPU scheme is applied to avoid over-limiting the intra block size. One example of the spec is illustrated in Table 6 below.

TABLE 6

The example of the spec of the proposed method to
additionally consider chroma format monochrome The variable modeTypeCondition is derived as follows:
- If one of the following conditions is true, modeTypeCondition is set equal to 0
  - slice_type = = I and qtbtt_dual_tree_intra_flag is equal to 1
  - modeTypeCurr is not equal to MODE_ALL
  - chroma_format_idc is equal to 0
- Otherwise, if one of the following conditions is true, modeTypeCondition is set equal to 1
  - cbWidth * cbHeight is equal to 64 and split_qt_flag is equal to 1
  - cbWidth * cbHeight is equal to 64 and MttSplitMode[ x0 ][ y0 ][ mttDepth ] is equal to
    SPLIT_TT_HOR or SPLIT_TT_VER
  - cbWidth * cbHeight is equal to 32 and MttSplitMode[ x0 ][ y0 ][ mttDepth ] is equal to
    SPLIT_BT_HOR or SPLIT_BT_VER
- Otherwise, if one of the following conditions is true, modeTypeCondition is set equal to
  1 + (slice_type != I ? 1 : 0)
  - cbWidth * cbHeight is equal to 64 and MttSplitMode[ x0 ][ y0 ][ mttDepth ] is equal to
    SPLIT_BT_HOR or SPLIT_BT_VER
  - cbWidth * cbHeight is equal to 128 and MttSplitMode[ x0 ][ y0 ][ mttDepth ] is equal to
    SPLIT_TT_HOR or SPLIT_TT_VER
- Otherwise, modeTypeCondition is set equal to 0
mode_constraint_flag equal to 0 specifies that coding units inside the current coding tree node can only
use inter prediction coding modes. mode_constraint_flag equal to 1 specifies that coding units inside the
current coding tree node cannot use inter prediction coding modes.

To consider the chroma format monochrome, 4:2:0, 4:4:4 and 4:2:2 all together for the derivation of the modeTypeCondition, an example spec is given in Table 7 below.

TABLE 7

The example of the spec of the proposed method to consider
chroma format monochrome, 4:2:0, 4:4:4 and 4:2:2

The variable modeTypeCondition is derived as follows:
- If one of the following conditions is true, modeTypeCondition is set equal to 0
  - slice_type = = I and qtbtt_dual_tree_intra_flag is equal to 1
  - modeTypeCurr is not equal to MODE_ALL
  - chroma_format_idc is equal to 0
  - chroma_format_idc is equal to 3
- Otherwise, if one of the following conditions is true, modeTypeCondition is set equal to 1
  - cbWidth * cbHeight is equal to 64 and split_qt_flag is equal to 1 and chroma_format_idc is equal
    to 1or 2

TABLE 7-continued

The example of the spec of the proposed method to consider
chroma format monochrome, 4:2:0, 4:4:4 and 4:2:2

- cbWidth * cbHeight is equal to 64 and MttSplitMode[ x0 ][ y0 ][ mttDepth ] is equal to
  SPLIT_TT_HOR or SPLIT_TT_VER and chroma_format_idc is equal to 1 or 2
- cbWidth * cbHeight is equal to 32 and MttSplitMode[ x0 ][ y0 ][ mttDepth ] is equal to
  SPLIT_BT_HOR or SPLIT_BT_VER and chroma_format_idc is equal to 1 or 2
- Otherwise, if one of the following conditions is true, modeTypeCondition is set equal to
  1 + (slice_type != I ? 1 : 0)
  - cbWidth * cbHeight is equal to 64 and MttSplitMode[ x0 ][ y0 ][ mttDepth ] is equal to
    SPLIT_BT_HOR or SPLIT_BT_VER and chroma_format_idc is equal to 1
  - cbWidth * cbHeight is equal to 128 and MttSplitMode[ x0 ][ y0 ][ mttDepth ] is equal to
    SPLIT_TT_HOR or SPLIT_TT_VER and chroma_format_idc is equal to 1
- Otherwise, modeTypeCondition is set equal to 0
mode_constraint_flag equal to 0 specifies that coding units inside the current coding tree node can only
use inter prediction coding modes. mode_constraint_flag equal to 1 specifies that coding units inside the
current coding tree node cannot use inter prediction coding modes.

It is noted that Table 7 could be further simplified into Table 8 shown below without changing the function of the modeTypeCondition derivation.

TABLE 8

The example of the spec of the proposed method to consider
chroma format monochrome, 4:2:0, 4:4:4 and 4:2:2

The variable modeTypeCondition is derived as follows:
- If one of the following conditions is true, modeTypeCondition is set equal to 0
  - slice_type = = I and qtbtt_dual_tree_intra_flag is equal to 1
  - modeTypeCurr is not equal to MODE_ALL
  - chroma_format_idc is equal to 0
  - chroma_format_idc is equal to 3
- Otherwise, if one of the following conditions is true, modeTypeCondition is set equal to 1
  - cbWidth * cbHeight is equal to 64 and split_qt_flag is equal to 1
  - cbWidth * cbHeight is equal to 64 and MttSplitMode[ x0 ][ y0 ][ mttDepth ] is equal to
    SPLIT_TT_HOR or SPLIT_TT_VER
  - cbWidth * cbHeight is equal to 32 and MttSplitMode[ x0 ][ y0 ][ mttDepth ] is equal to
    SPLIT_BT_HOR or SPLIT_BT_VER
- Otherwise, if one of the following conditions is true, modeTypeCondition is set equal to
  1 + (slice_type != I ? 1 : 0)
  - cbWidth * cbHeight is equal to 64 and MttSplitMode[ x0 ][ y0 ][ mttDepth ] is equal to
    SPLIT_BT_HOR or SPLIT_BT_VER and chroma_format_idc is equal to 1
  - cbWidth * cbHeight is equal to 128 and MttSplitMode[ x0 ][ y0 ][ mttDepth ] is equal to
    SPLIT_TT_HOR or SPLIT_TT_VER and chroma_format_idc is equal to 1
- Otherwise, modeTypeCondition is set equal to 0
mode_constraint_flag equal to 0 specifies that coding units inside the current coding tree node can only
use inter prediction coding modes. mode_constraint_flag equal to 1 specifies that coding units inside the
current coding tree node cannot use inter prediction coding modes.

In some embodiments, it is proposed that when non-inter is signaled as the mode of the SCIPU or the modeTypeCondition of the SCIPU is non-inter (e.g. modeTypeCondition=0), only intra prediction modes, IBC are allowed for the CUs within the SCIPU and the chroma block could not be split into small chroma blocks such as 2×2, 2×4 or 4×2. Otherwise when inter is signaled as the mode of the SCIPU, inter modes and palette modes are allowed for the CUs within the SCIPU and the chroma block could be split into small chroma blocks such as 2×2, 2×4 or 4×2. It is noted that the naming of the modes could be renamed from "non-inter" to "intra+ibc" and from "inter" to "inter+plt" accordingly to avoid confusion.

Figure 8:
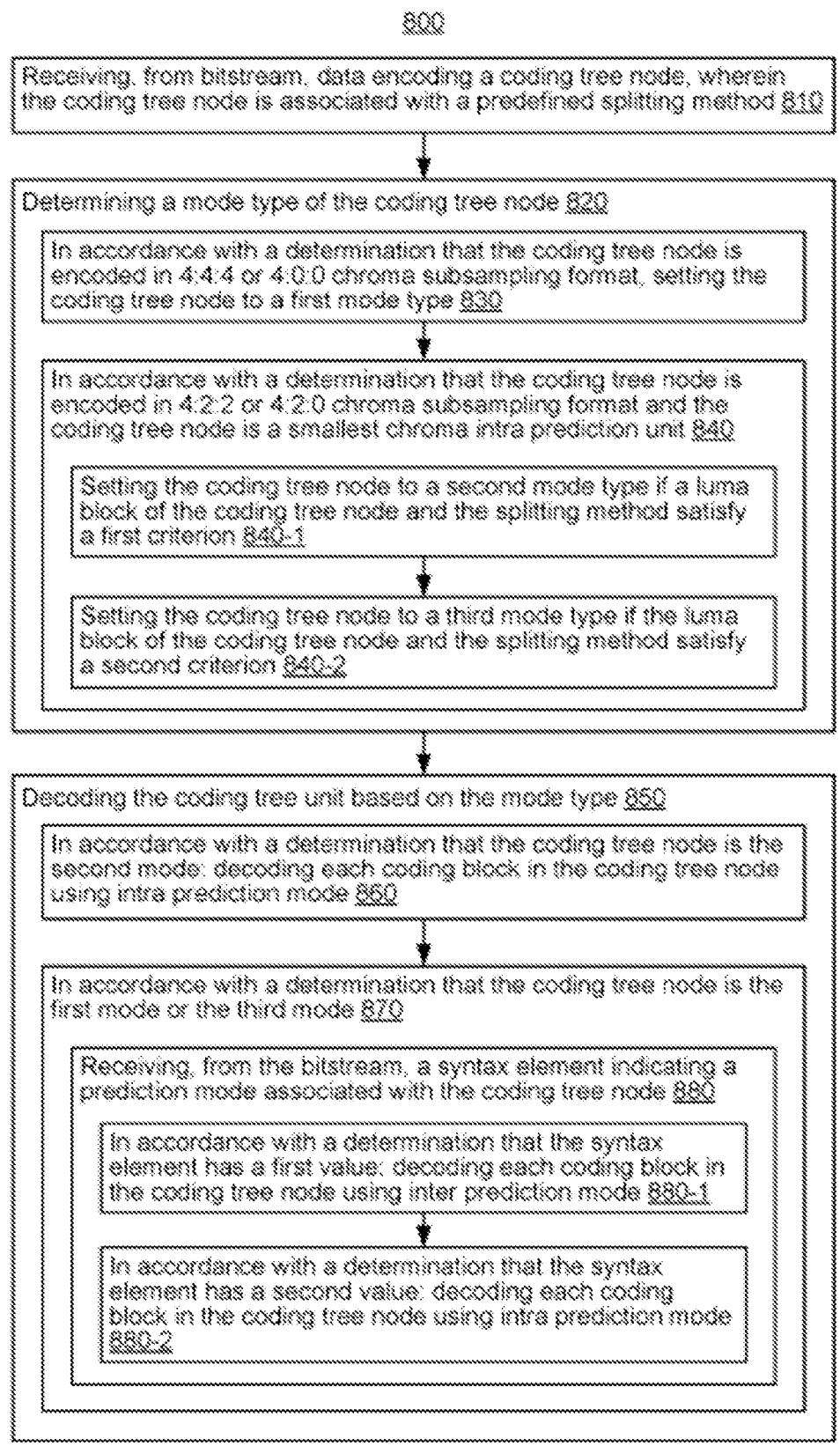
FIG. 8 is a flowchart illustrating an exemplary process by which a video decoder implements the techniques of decoding a smallest chroma intra prediction unit (SCIPU) in accordance with some implementations of the present disclosure.

FIG. 8 is a flowchart illustrating an exemplary process 800 by which a video decoder 30 implements the techniques of decoding a smallest chroma intra prediction unit (SCIPU) in accordance with some implementations of the present disclosure.

As the first step, the video decoder 30 receives, from bitstream, data encoding a coding tree node, wherein the coding tree node is associated with a predefined splitting method (e.g., horizontal/vertical binary split, horizontal/vertical ternary split, etc.) (810). Refer to FIG. 4E and the related description for examples of predefined splitting methods.

The video decoder 30 then determines a mode type of the coding tree node (e.g., setting the modeTypeCondition flag associated with the coding tree node) (820) in the following manner: in accordance with a determination that the coding tree node is encoded in 4:4:4 or 4:0:0 chroma subsampling format, the video decoder 30 sets the coding tree node to a first mode type (e.g., modeTypeCondition==0, indicating that the coding tree node is not SCIPU) (830); and in accordance with a determination that the coding tree node is encoded in 4:2:2 or 4:2:0 chroma subsampling format and the coding tree node is a smallest chroma intra prediction unit (SCIPU) (840): the video decoder 30 sets the coding tree node to a second mode type (e.g., modeTypeCondition==1) if a luma block of the coding tree node and the splitting method satisfy a first criterion (e.g., "modeTypeCondition==1" means splitting a luma block of the coding tree node with the splitting method would result in a child luma block with a block size equal to 16 luma samples; therefore, the prediction mode is inferred as "intra" and no syntax element of prediction mode is signaled) (840-1); and the video decoder 30 sets the coding tree node to a third mode type (e.g., modeTypeCondition==2) if the luma block of the coding tree node and the splitting method satisfy a second criterion (e.g., "modeTypeCondition==2" means splitting the luma block of the coding tree node with the splitting method would not result in the child luma block with the block size equal to 16 luma samples and the syntax element of prediction mode is signaled) (840-2).

After setting the mode type, the video decoder 30 decodes the coding tree unit based on the mode type (850) in the following manner: in accordance with a determination that the coding tree node is the second mode (e.g., non-inter mode for SCIPU, modeTypeCondition==1): the video decoder 30 decodes each coding block in the coding tree node using intra prediction mode (860); and in accordance with a determination that the coding tree node is the first mode (e.g., not SCIPU) or the third mode (e.g., non-inter for SCIPU) (870): the video decoder 30 receives, from the bitstream, a syntax element (e.g., mode_constraint_flag) indicating a prediction mode associated with the coding tree node (880).

After receiving the syntax element, in accordance with a determination that the syntax element has a first value (e.g., mode_constraint_flag==0): the video decoder 30 decodes each coding block in the coding tree node using inter prediction mode (880-1); and in accordance with a determination that the syntax element has a second value (e.g., mode_constraint_flag==1): the video decoder 30 decodes each coding block in the coding tree node using intra prediction mode (880-2).

In some embodiments, the chroma blocks of the coding tree node can be further split when the coding tree node is the first mode type.

In some embodiments, the chroma blocks of the coding tree node cannot be further split when the coding tree node is the second mode type.

In some embodiments, the chroma blocks of the coding tree node cannot be further split when the coding tree node is the third mode type and a prediction mode indicate that current coding tree node is intra mode.

In some embodiments, the chroma blocks of the coding tree node can be further split when the coding tree node is the third mode type and a prediction mode indicate that current coding tree node is NOT intra mode.

In some embodiments, the coding tree node is the SCIPU if a chroma block of the coding tree node has a chroma block and splitting the chroma block with the splitting method would result in a child chroma block violating a minimum size limitation of intra chroma block (e.g., with the child chroma block size smaller than 16 chroma samples).

In some embodiments, the luma block of the coding tree node and the splitting method satisfy the first criterion if splitting the luma block of the coding tree node with the splitting method would result in a child luma block with a block size equal to 16 luma samples.

In some embodiments, the luma block of the coding tree node and the splitting method satisfy the first criterion if: the size of the luma block is 64 luma samples, and the splitting method is quad split (e.g., as shown in Table 9: cbWidth*cbHeight is equal to 64 and split_qt_flag is equal to 1 and chroma_format_idc is equal to 1 or 2); the size of the luma block is 64 luma samples, and the splitting method is horizontal or vertical ternary split (e.g., as shown in Table 9: cbWidth*cbHeight is equal to 64 and MttSplitMode[x0][y0][mttDepth] is equal to SPLIT_TT_HOR or SPLIT_TT_VER); or the size of the luma block is 32 luma samples, and the splitting method is horizontal or vertical binary split (e.g., as shown in Table 9: cbWidth*cbHeight is equal to 32 and MttSplitMode[x0][y0][mttDepth] is equal to SPLIT_BT_HOR or SPLIT_BT_VER).

In some embodiments, the luma block of the coding tree node and the splitting method satisfy the second criterion if the coding tree node is not in an I-Slice and splitting the luma block of the coding tree node with the splitting method would not result in a child luma block with a block size equal to 16 luma samples (e.g., the resulting child luma block will be larger than 16 luma samples).

In some embodiments, the luma block of the coding tree node and the splitting method satisfy the second criterion if the coding tree node is not of an I-Slice (e.g., in table 9: slice_type !=I) and: the size of the luma block is 64 luma samples and the splitting method is horizontal or vertical binary split (e.g., in table 9: cbWidth*cbHeight is equal to 64 and MttSplitMode[x0][y0][mttDepth] is equal to SPLIT_BT_HOR or SPLIT_BT_VER and chroma_format_idc is equal to 1); or the size of the luma block is 128 luma samples and the splitting method is horizontal or vertical ternary split (e.g., in table 9: cbWidth*cbHeight is equal to 128 and MttSplitMode[x0][y0][mttDepth] is equal to SPLIT_TT_HOR or SPLIT_TT_VER and chroma_format_idc is equal to 1).

In some embodiments, in accordance with a determination that the coding tree node is encoded in 4:2:2 or 4:2:0 chroma subsampling format and is not the SCIPU (e.g., splitting a chroma block would not result in violation of the minimum size limitation of intra chroma block), the video decoder 30 sets the coding tree node to the first mode (e.g., splitting would not result in a child chroma block smaller than 16 chroma samples).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method for video decoding, comprising:
   receiving, from a bitstream, a coding unit associated with a predefined splitting method;
   determining a mode type condition of the coding unit, including:
      in accordance with a determination that the coding unit is encoded in 4:4:4 or 4:0:0 chroma format, setting the mode type condition of the coding unit to a first mode type condition;
      in accordance with a determination that the coding unit is encoded in 4:2:2 or 4:2:0 chroma format and the coding unit is a smallest chroma intra prediction unit (SCIPU):
         setting the mode type condition of the coding unit to a second mode type condition if a luma block of the coding unit and the splitting method satisfy a first criterion; and
         setting the mode type condition of the coding unit to a third mode type condition if the luma block of the coding unit and the splitting method satisfy a second criterion; and
   decoding the coding unit based on the mode type condition of the coding unit, including:
      in accordance with a determination that the mode type condition of the coding unit is the second mode type condition:
         decoding each coding block in the coding unit using an intra mode,
      in accordance with a determination that the mode type condition of the coding unit is the third mode type condition:
         receiving, from the bitstream, a syntax element indicating a prediction mode associated with the coding unit:
            in accordance with a determination that the syntax element has a first value: decoding each coding block in the coding unit using an inter mode; and
            in accordance with a determination that the syntax element has a second value: decoding each coding block in the coding unit using the intra mode.

2. The method of claim 1, wherein chroma blocks of the coding unit are allowed to be further split when the mode type condition of the coding unit is the first mode type condition.

3. The method of claim 1, wherein chroma blocks of the coding unit are disallowed to be further split when the mode type condition of the coding unit is the second mode type condition.

4. The method of claim 1, wherein chroma blocks of the coding unit are disallowed to be further split when the mode type condition of the coding unit is the third mode type condition and the prediction mode indicates that current coding unit is in the intra mode.

5. The method of claim 1, wherein chroma blocks of the coding unit are allowed to be further split when the coding unit is the third mode type condition and the prediction mode indicates that current coding unit is not in the intra mode.

6. The method of claim 1, wherein the coding unit is the SCIPU if the coding unit has a chroma block and splitting the chroma block with the splitting method is to result in a child chroma block violating a minimum size limitation of intra chroma block.

7. The method of claim 1, wherein the luma block of the coding unit and the splitting method satisfy the first criterion if splitting the luma block of the coding unit with the splitting method is to result in a child luma block with a block size equal to 16.

8. The method of claim 1, wherein the luma block of the coding unit and the splitting method satisfy the first criterion if:
   the size of the luma block is 64 and the splitting method is quad split;
   the size of the luma block is 64 and the splitting method is horizontal or vertical ternary split; or
   the size of the luma block is 32 and the splitting method is horizontal or vertical binary split.

9. The method of claim 1, wherein the luma block of the coding unit and the splitting method satisfy the second criterion if the coding unit is not in an I-slice and splitting the luma block of the coding unit with the splitting method is not to result in a child luma block with a block size equal to 16.

10. The method of claim 1, wherein the luma block of the coding unit and the splitting method satisfy the second criterion if the coding unit is not in an I-slice and:
    the size of the luma block is 64 and the splitting method is horizontal or vertical binary split; or
    the size of the luma block is 128 and the splitting method is horizontal or vertical ternary split.

11. The method of claim 1, further comprising:
    in accordance with a determination that the coding unit is encoded in 4:2:2 or 4:2:0 chroma format and is not the SCIPU, setting the mode type condition of the coding unit to the first mode type condition.

12. An electronic apparatus comprising:
    one or more processing units;
    memory coupled to the one or more processing units; and
    a plurality of programs stored in the memory that, when executed by the one or more processing units, cause the electronic apparatus to perform acts comprising:
    receiving, from a bitstream, a coding unit associated with a predefined splitting method;

determining a mode type condition of the coding unit, including:
  in accordance with a determination that the coding unit is encoded in 4:4:4 or 4:0:0 chroma format, setting the mode type condition of the coding unit to a first mode type condition;
  in accordance with a determination that the coding unit is encoded in 4:2:2 or 4:2:0 chroma format and the coding unit is a smallest chroma intra prediction unit (SCIPU):
    setting the mode type condition of the coding unit to a second mode type condition if a luma block of the coding unit and the splitting method satisfy a first criterion; and
    setting the mode type condition of the coding unit to a third mode type condition if the luma block of the coding unit and the splitting method satisfy a second criterion; and
decoding the coding unit based on the mode type condition of the coding unit, including:
  in accordance with a determination that the mode type condition of the coding unit is the second mode type condition:
    decoding each coding block in the coding unit using an intra mode,
  in accordance with a determination that the mode type condition of the coding unit is the third mode type condition:
    receiving, from the bitstream, a syntax element indicating a prediction mode associated with the coding unit:
      in accordance with a determination that the syntax element has a first value: decoding each coding block in the coding unit using an inter mode; and
      in accordance with a determination that the syntax element has a second value: decoding each coding block in the coding unit using the intra mode.

13. The electronic apparatus of claim 12, wherein chroma blocks of the coding unit are allowed to be further split when the mode type condition of the coding unit is the first mode type condition.

14. The electronic apparatus of claim 12, wherein chroma blocks of the coding unit are disallowed to be further split when the mode type condition of the coding unit is the second mode type condition.

15. The electronic apparatus of claim 12, wherein chroma blocks of the coding unit are disallowed to be further split when the mode type condition of the coding unit is the third mode type condition and the prediction mode indicates that current coding unit is in the intra mode.

16. The electronic apparatus of claim 12, wherein chroma blocks of the coding unit are allowed to be further split when the coding unit is the third mode type condition and the prediction mode indicates that current coding unit is not in the intra mode.

17. The electronic apparatus of claim 12, wherein the coding unit is the SCIPU if the coding unit has a chroma block and splitting the chroma block with the splitting method is to result in a child chroma block violating a minimum size limitation of intra chroma block.

18. The electronic apparatus of claim 12, wherein the luma block of the coding unit and the splitting method satisfy the first criterion if splitting the luma block of the coding unit with the splitting method is to result in a child luma block with a block size equal to 16.

19. The electronic apparatus of claim 12, wherein the luma block of the coding unit and the splitting method satisfy the first criterion if:
  the size of the luma block is 64 and the splitting method is quad split;
  the size of the luma block is 64 and the splitting method is horizontal or vertical ternary split; or
  the size of the luma block is 32 and the splitting method is horizontal or vertical binary split.

20. A non-transitory computer readable storage medium storing a bitstream for processing by an electronic apparatus having one or more processing units, wherein the bitstream, when processed by the one or more processing units, cause the electronic apparatus to perform acts comprising:
  receiving, from a bitstream, a coding unit associated with a predefined splitting method;
  determining a mode type condition of the coding unit, including:
    in accordance with a determination that the coding unit is encoded in 4:4:4 or 4:0:0 chroma format, setting the mode type condition of the coding unit to a first mode type condition;
    in accordance with a determination that the coding unit is encoded in 4:2:2 or 4:2:0 chroma format and the coding unit is a smallest chroma intra prediction unit (SCIPU):
      setting the mode type condition of the coding unit to a second mode type condition if a luma block of the coding unit and the splitting method satisfy a first criterion; and
      setting the mode type condition of the coding unit to a third mode type condition if the luma block of the coding unit and the splitting method satisfy a second criterion; and
  decoding the coding unit based on the mode type condition of the coding unit, including:
    in accordance with a determination that the mode type condition of the coding unit is the second mode type condition:
      decoding each coding block in the coding unit using an intra mode,
    in accordance with a determination that the mode type condition of the coding unit is the third mode type condition:
      receiving, from the bitstream, a syntax element indicating a prediction mode associated with the coding unit:
        in accordance with a determination that the syntax element has a first value: decoding each coding block in the coding unit using an inter mode; and
        in accordance with a determination that the syntax element has a second value: decoding each coding block in the coding unit using the intra mode.

\* \* \* \* \*